March 7, 1950

V. H. DIETZ 2,499,852

APPARATUS FOR DETERMINING THE pH OF
SMALL AMOUNTS OF A SPECIMEN

Filed Nov. 26, 1948

VICTOR H. DIETZ
INVENTOR.

BY Beale and Jones
ATTORNEYS

Patented Mar. 7, 1950

2,499,852

UNITED STATES PATENT OFFICE 2,499,852

APPARATUS FOR DETERMINING THE pH OF SMALL AMOUNTS OF A SPECIMEN

Victor H. Dietz, Ypsilanti, Mich.

Application November 26, 1948, Serial No. 61,958

2 Claims. (Cl. 204—195)

1

This invention relates to micro-cells for use in determining the pH of minute quantities of a specimen and more particularly to micro-beakers adapted for use with common types of electrodes for the purpose stated to provide micro-cells.

It is often necessary in certain micro-biological procedures to determine the pH of a minute quantity of a fluid which may not possess a sufficient buffer capacity to permit dilution to the minimal quantity of approximately 2 ml. which is required in conducting determinations in standard specimen cups consisting of 5 ml. beakers. Other procedures, occasionally requiring subsequent analyses on the same minute amount of specimen, may not permit of dilution despite the inherent buffer capacity. Furthermore, the advantage of being able to test small amounts of costly extracts is quite obvious. The apparatus which has been available heretofore for conducting determinations of the types described ordinarily consists of specially designed electrodes; such as, for example, glass electrodes wherein the sensitive membrane is in the form of a cup adapted to receive a small amount of a specimen. There is a disadvantage in that the use of electrodes of special design necessitates the use of special electrode supports when such electrodes are employed in common laboratory type pH meter equipment. This is particularly objectionable in laboratories where a number of investigators performing both macro- and micro-determinations use the same equipment and are obliged to consume time in substituting electrodes as well as associated equipment.

The foregoing disadvantages are overcome by this invention which, briefly stated, consists of a micro-beaker which may be placed in the beaker supports of laboratory type pH meter equipment sold by laboratory supply companies. The micro-beaker comprises a body having upper and lower substantially parallel planar surfaces the uppermost of said surfaces being provided with closely adjacent depressions so shaped and of sufficient depth to receive the lowermost portions of the electrodes usually employed therewith to provide a micro-cell. The surfaces of the depressions in the micro-beaker conform with the shape of the terminal portions of the electrodes inserted therein in such a manner that the surfaces of the inserted portion of each electrode are in continuous contact with the surfaces of the cooperating depression. The electrode receiving depressions are connected by a straight horizontally extending shallow channel formed in the uppermost surface of the micro-beaker which

2 channel provides a bridge between the depressions.

It is an object of this invention to provide a micro-cell for determining the pH of minute amounts of a specimen with great accuracy.

Another object of this invention is to provide a micro-cell for determining the pH of a specimen in which the area of contact between the surfaces of the electrodes and a minute amount of specimen is exceptionally large.

Still another object of this invention is to provide a micro-beaker adapted to cooperate with all types of the common electrodes for measuring pH and pH meters of the laboratory type to form a micro-cell.

A further object of this invention is to provide an inexpensive, strong, durable and substantially unbreakable micro-beaker adapted to cooperate with electrodes for measuring pH to form a micro-cell which micro-beaker does not scratch or otherwise damage the electrodes employed therewith.

A still further object of this invention is to provide a micro-beaker which may be employed by simple technique to form a micro-cell without requiring the use of electrodes and other apparatus of specialized construction and which may be readily cleaned and disinfected.

Other objects of this invention will be apparent from the following description and the accompanying drawing wherein.

Figure 1:
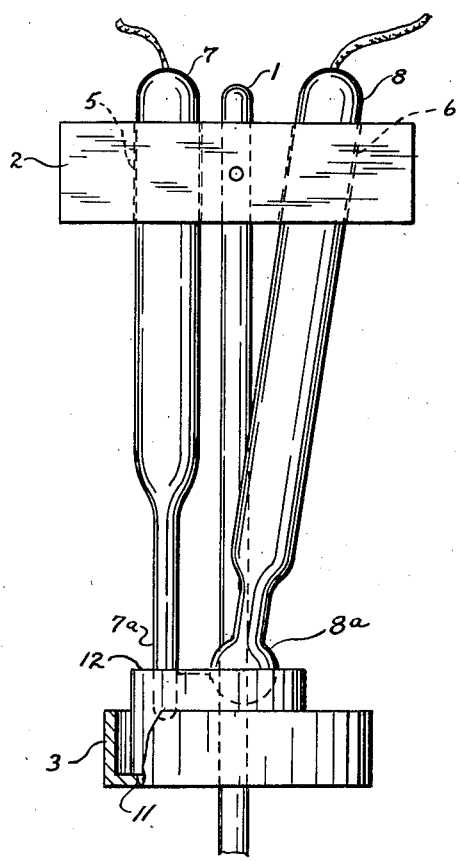
Figure 1 is a front elevational view of the micro-cell comprising this invention with a portion of the micro-beaker support removed.
Figure 2:
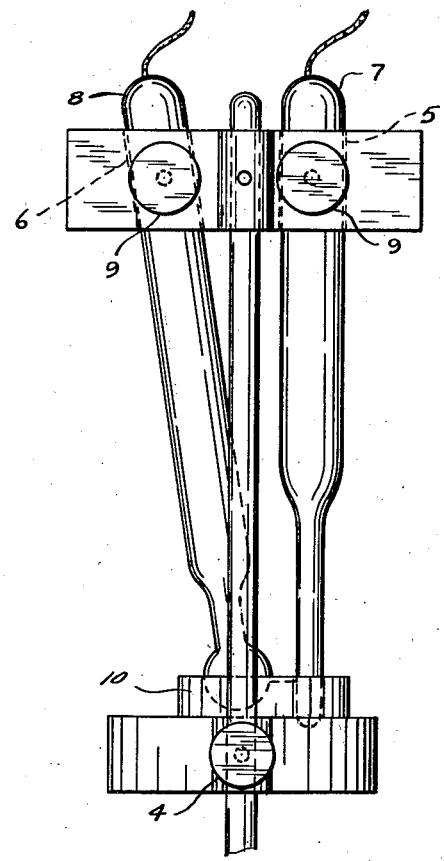
Figure 2 is a rear elevational view of the micro-cell shown in Figure 1.

Referring to the drawings in detail, a micro-cell embodying the features of the present invention is shown in Figures 1 and 2 as comprising an electrode holder assembly which includes a vertical supporting rod 1 having an electrode support 2 and a beaker support 3 mounted thereon. The beaker support 3 is vertically adjustable on the supporting rod 1 and may be secured in the desired position by means of the set screw 4. The supporting rod 1 may be mounted on the inner face of the door of any common laboratory type pH meter by means of a bracket. The electrode support 2 is provided with openings 5 and 6 adapted to receive the electrodes; such as, for example, a calomel electrode 7 and a glass electrode 8. The electrodes are adjustably mounted in the electrode holder 2 and may be secured in the desired position by set-screws 9—9. The longitudinal axes of the openings in the electrode support 2 are preferably disposed in such a manner that one of the electrodes is vertically adjustable on a line normal to the supporting surface of the beaker support 3 and the other electrode is similarly adjustable but on a line inclined to the same supporting surface. Thus, in Figures 1 and 2 the calomel electrode 7 is shown as being perpendicularly adjustable and the glass electrode 8 is shown as being adjustable on an inclined path which converges toward the electrode 7.

Figure 3:
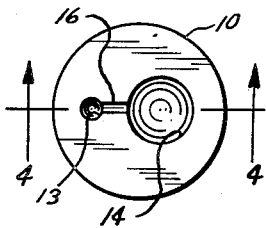
Figure 3 is a top plan view of a micro-beaker embodying the features of the present invention.
Figure 4:
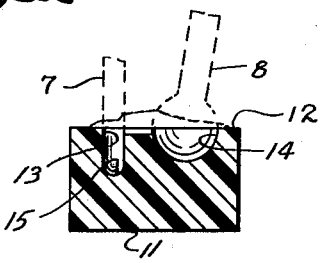
Figure 4 is a side elevational view in cross-section of the micro-beaker taken along line 4—4 of Figure 3 with the terminal portions of glass and calomel electrodes and a specimen to be tested shown in dotted lines.

The micro-beaker of the present invention comprises a receptacle element 10 which is preferably a cylindrically-shaped member though it may be of any shape which provides a broad, uninterrupted lateral surface 11 adapted to cooperate with the supporting surface of the beaker support 3 and an uppermost surface 12 substantially parallel to the lateral surface 11. The transverse dimensions of the receptacle element 10, regardless of its shape, are such that the receptacle may be moved laterally in the beaker support 3 when it rests upon the supporting surface thereof. The uppermost surface 12 of the receptacle element 10 is provided with closely adjacent depressions 13 and 14 which are so shaped and of sufficient depth to receive and envelop the lowermost portions of the electrodes employed with the receptacle. The depressions 13 and 14 may be of any desired shape, the latter being dependent upon the shape of the terminal portions of the electrodes employed therewith. It is essential, however, that the surfaces of the depressions 13 and 14 conform with the shape of the terminal portions of the electrodes inserted therein in such a manner that the surfaces of the inserted portion of each electrode are in continuous contact with the surfaces of the cooperating depression. The depressions may be varied in shape and size to accommodate any electrode; such as, for example, glass, calomel, quinhydrone or the like. The receptacle element 10 may thus be adapted to accommodate electrodes of any size and, furthermore, adapted to provide for any depth of insertion of the electrode in the receptacle desired. In Figures 3 and 4 a depression 13 which is slightly deeper than the depression 14 is shown with a vertical axis normal to the lateral surface 11 and a rounded bottom 15. The depression 13 is adapted to receive and envelop the terminal portion 7a of the calomel electrode 7 as the latter is moved along a vertical path and inserted in the depression. The depression 14 is hemispherical in shape and is adapted to receive and envelop the terminal portion 8a of the glass electrode 8 as the latter is moved along a path converging with that of the calomel electrode 7. A bridge between the electrodes is provided by forming a straight shallow channel 16 in the uppermost surface 12 of the receptacle element 10 which extends between and connects the depressions 13 and 14. The total volume of the depressions 13 and 14, and the channel 16, preferably should not exceed 0.2 ml.

The receptacle element 10 may be formed of any suitable material; such as, for example, a synthetic resinous material, rubber, glass or the like. It is preferred, however, to employ polymerized methyl methacrylate or related polymeric materials. The receptacle may be produced by cutting a section approximately one-half inch in length from a cast rod of polymerized methyl methacrylate having a diameter of about three-fourths of an inch. A $\frac{3}{16}$ inch and a $\frac{1}{4}$ inch round surgical bur may be used to cut the depressions 13 and 14, respectively, to the desired depth. The channel 16 between the depressions is cut with an $\frac{1}{8}$ inch round surgical or dental bur. The depressions and channel are polished with burs wound with cotton and employing extra fine pumice and water. It is then given a lustrous and smooth finish with a thin paste composed of tin oxide in water, this operation being performed with either hand rotor devices or a dental engine. The cutting and polishing operations should be performed slowly in order to avoid generating sufficient heat to depolymerize the surface of the resinous material or, in the event glass is employed, devitrification of the surfaces thereof. The entire micro-beaker may then be smoothed and polished with the same abrading materials, using a medium size polishing wheel. In lieu of the foregoing method, standard casting or injection molding processes may be employed to produce these micro-beakers which are of excellent density, prefectly formed, and have mirror-like surfaces.

An advantage of employing micro-beakers formed of synthetic resinous materials is that such beakers possess relatively soft and resilient surfaces which will not scratch or damage the cell electrodes. The micro-beakers of the present invention may be readily cleaned or disinfected; and, if formed of polymerized methyl methacrylate, are resistant to acid and alkali throughout the usual range of about pH 2 to about pH 10. A soft brush or cloth may be used with warm water and soap or synthetic detergents to clean the micro-beakers. They may be disinfected by immersion in a 1:1000 solution of bichloride of mercury. Unlike other micro-pH electrode devices, which are fragile, the micro-beakers of this invention are durable, rugged and substantially unbreakable. If the specimen to be tested is not compatible with the synthetic resinous material forming the micro-beaker, a glass micro-beaker embodying the features of this invention may be employed but the synthetic resinous material is comparable to soft glass as a non-conductor and possesses less porosity.

In testing minute quantities of a specimen with the micro-cells of the present invention, it is particularly desirable that the electrodes and micro-beaker be scrupulously clean and adequately rinsed. The electrodes are usually rinsed three times and blotted with a fresh sheet of cleansing tissue; though the standard 5 ml. specimen cup, in which the electrodes are maintained in distilled water, may be used for the first rinse, thus eliminating one step. This rinsing procedure is especially recommended if the specimen should be poorly buffered. Any semi-solid or viscous specimen may be tested in the micro-cell as well as virtually any technical or biological solution which does not attack the synthetic resinous material forming the micro-beaker. While the total volume of the depressions 13 and 14, and the channel 16, preferably does not exceed 0.2 ml., as small an amount of specimen as 0.1 ml. may be expediently employed due to the combined displacing volumes of the two electrodes inserted into the micro-beaker. One simple procedure which may be employed is to place a drop or about 0.05 ml. in each depression in the micro-beaker, remove the standard 5 ml. specimen cup from the beaker support 3 and place the micro-beaker therein. The electrode set screws 9—9 may be loosened and the electrodes 7 and 8 moved along their respective perpendicular and inclined paths until the terminal portions 7a and 8a thereof are inserted in the cooperating depressions 13 and 14. The specimen in each depression is displaced by the inserted electrode and flows over the entire surface of the depression forming a large contact area between the surface of the inserted terminal portion of each electrode which provides for exceptionally accurate determinations. The insertion of the electrodes in the depressions simultaneously forms a bridge of specimen in the channel 16 due to flow caused by electrode displacement of the specimen. If the specimen is extremely viscous or semi-solid the necessary flow to form the bridge between the depressions must be provided by manual manipulation. Furthermore, in testing such viscous or semi-solid specimens care must be exercised that no air is trapped in a depression adapted to receive an electrode having a porous fiber immersion tip, such as, for example, a calomel electrode. A biological specimen; such as, for example, frog eggs, may be tested simply by smearing the specimen into the depressions and crushing the specimen with the inserted electrodes to make contact. In using the micro-beaker with the readily available laboratory type pH meters it is not necessary to remove the electrodes from their support. The low height of the micro-beaker permits ready replacement of the standard 5 ml. specimen cup with the micro-beaker; and, since the micro-beaker is of smaller diameter than the inner portion of the beaker support, lateral movement of the micro-beaker in the support insures simple flexibility of adjustment. The micro-beaker may be removed intact and replaced with the usual 5 ml. specimen cup without replenishing the distilled water and buffer solution in which the electrodes are maintained. The ease with which the micro-beaker may be incorporated into the pH meter or removed permits the meter to be employed in conducting a series of macro- or micro-determinations without the necessity for removing or replacing the electrodes or utilizing any other special equipment.

Figure 5:
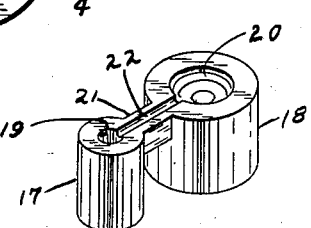
Figure 5 is a perspective view of a modified form of micro-beaker.

A modified form of micro-beaker is disclosed in Figure 5 which comprises a closely spaced pair of specimen receiving receptacle portions 17 and 18. These receptacle portions are provided with depressions 19 and 20 which conform in shape with the terminal portions of the standard pH electrodes employed with the micro-beaker. The receptacle portions 17 and 18 are integrally interconnected adjacent their upper ends by a bridge element 21 having a short straight channel 22 formed therein which extends between depressions 19 and 20. A small quantity of specimen may be placed in each of the depressions and the standard pH electrodes inserted therein. The specimen is then displaced to form a thin film between the surfaces of each depression and those of the terminal portions of the corresponding inserted electrode. The displaced specimen also flows through the channel 22 forming a bridge of specimen between the depressions 19 and 20.

I claim:

1. A micro-cell for pH determinations of minute quantities of a specimen comprising a receptacle member having a pair of closely adjacent depressions formed therein, said depressions being interconnected by a straight channel formed in said member, a pH electrode, and a reference electrode, the terminal portions of each of said electrodes being inserted into a respective depression, the shape of each depression conforming with that of the terminal portion of the electrode inserted therein and the size of the inserted portion of each electrode being approximately the same as that of its corresponding depression, whereby a minute quantity of specimen disposed in each depression will be displaced by the terminal portion of the electrode inserted therein and caused to flow over the surface of each of said depressions to provide a thin film of specimen between the surface of each of said depressions and the surface of the terminal portion of the corresponding inserted electrode coextensive therewith.

2. A micro-cell for pH determinations of minute quantities of a specimen comprising a closely spaced pair of specimen receiving receptacle portions, said receptacle portions each having a depression formed therein, a bridging element interconnecting said receptacle portions adjacent their upper ends, said bridging element having a short straight shallow specimen receiving channel formed therein interconnecting said depressions and adapted to receive overflow of specimen fluid from either of said receptacle portion depressions, a pH electrode, and a reference electrode, the terminal portions of each of said electrodes being inserted into a respective depression, the shape of each depression conforming with that of the terminal portion of the electrode inserted therein and the size of the inserted portion of each electrode being approximately the same as that of its corresponding depression, whereby a minute quantity of specimen disposed in each depression will be displaced by the terminal portion of the electrode inserted therein and caused to flow over the surface of each of said depressions to provide a thin film of specimen between the surface of each of said depressions and the surface of the terminal portion of the corresponding inserted electrode coextensive therewith.

VICTOR H. DIETZ.

REFERENCES CITED

The following references are of record in the file of this patent:

UNITED STATES PATENTS

| Number | Name | Date |
|---|---|---|
| 2,108,293 | Perley | Feb. 15, 1938 |
| 2,183,531 | Allison | Dec. 19, 1939 |
| 2,351,282 | Oliver | June 13, 1944 |

OTHER REFERENCES

"The ABC of Hydrogen Ion Control," 5th ed. (1929) of La Motte Chemical Products Company, Baltimore, Md., page 102.